(12) United States Patent
Overmyer

(10) Patent No.: US 12,236,286 B2
(45) Date of Patent: Feb. 25, 2025

(54) AUTOMATED API INTEGRATION SYSTEM AND METHOD

(71) Applicant: GO Beyond Solutions LLC, Austin, TX (US)

(72) Inventor: Garth Overmyer, Trophy Club, TX (US)

( * ) Notice: Subject to any disclaimer, the term of this patent is extended or adjusted under 35 U.S.C. 154(b) by 85 days.

(21) Appl. No.: 18/323,324

(22) Filed: May 24, 2023

(65) Prior Publication Data

US 2024/0394118 A1 Nov. 28, 2024

(51) Int. Cl.
*G06F 9/54* (2006.01)
*G06F 11/263* (2006.01)

(52) U.S. Cl.
CPC .............. *G06F 9/54* (2013.01); *G06F 11/263* (2013.01)

(58) Field of Classification Search
CPC ................................ G06F 11/263; G06F 9/54
See application file for complete search history.

(56) References Cited

U.S. PATENT DOCUMENTS

| | | | | |
|---|---|---|---|---|
| 2023/0168874 A1* | 6/2023 | Makhija | .................. | G06F 9/451 |
| | | | | 719/320 |
| 2023/0186117 A1* | 6/2023 | Durvasula | ................ | G06N 3/09 |
| | | | | 706/12 |

* cited by examiner

*Primary Examiner* — Jigar P Patel
(74) *Attorney, Agent, or Firm* — Lockhart IP; Curtis W. Lockhart

(57) ABSTRACT

A system and method to automate an integration of one or more application program interfaces (APIs) are disclosed. The method includes receiving an API documentation associated with the one or more APIs and extracting one or more parameters from the received API documentation. Further, the method comprises generating one or more integration scripts and one or more templates and identifying one or more data mappings between one or more data formats associated with the one or more APIs. Further, the method includes implementing a data transformation logic for seamless data flow and compatibility between the one or more APIs. The method includes executing a set of test cases and a set of scenarios for identifying one or more issues in the one or more APIs.

20 Claims, 2 Drawing Sheets

AUTOMATED API INTEGRATION SYSTEM AND METHOD

COPYRIGHT AND TRADE DRESS NOTICE

A portion of the disclosure of this patent document contains material that is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

BACKGROUND

1. Field of the Invention

Embodiments of the present disclosure relates generally to Application Programming Interfaces (APIs), and more particularly, to a system and method of automating an integration of one or more APIs.

2. Description of Related Art

This background information is intended to further educate the reader as to additional aspects of the prior art and may present examples of specific aspects of the prior art that is not to be construed as limiting the disclosure of the present application.

An Application Programming Interface (API) is a set of protocols, routines, and tools that are used for building software applications. Essentially, the API is a way for different software systems to communicate with each other. In general, the API defines the interaction between the software application with other software applications or components, allowing developers to access data or functionality from one application in another application. APIs are useful for retrieving data, performing operations, and exchanging information between applications. APIs are widely used in software development, and many popular applications and services offer APIs that developers can use to integrate with software. For example, social media platforms offer APIs that developers use to access user data, and payment gateways offer APIs that developers use to process payments. An API integration refers to the process of connecting two or more software applications using the API and involves setting up a communication channel between the applications, so the APIs exchange data and functionality seamlessly.

With the advancements in technology, API integration is becoming increasingly common in modern software development because the API integration allows developers to leverage the power of existing software applications to create new and innovative solutions. For example, a developer may use an API to integrate a third-party payment gateway into the e-commerce platform, enabling customers to pay for products using a wide range of payment methods. The API integration typically involves multiple steps, including understanding the API documentation, setting up authentication and authorization, establishing data mapping and transfer protocols, and testing the integration thoroughly. The API integration requires a good understanding of both the source and target applications, as well as the underlying technologies and protocols involved in the integration.

APIs have become essential for businesses operating in today's fast-paced digital world, providing access to a wide range of services and systems across various industries. As these services continue to expand, and with the emergence of AI assistants, there has been a surge in the number and complexity of APIs that require integration. At the same time, companies are confronted with the task of consolidating and managing diverse data sources to offer a unified view of the customers. Further, overcoming these challenges requires innovative solutions that automate API integration and data mapping, enabling organizations to scale more efficiently and AI assistants to seamlessly access a broader range of services while providing a unified view of the customer. However, there are several obstacles to overcome. A conventional API integration and data mapping is time-consuming and labor-intensive, requiring significant manpower to manually read and understand API documentation, write code, map data fields, and perform testing which limits scalability and efficiency.

Additionally, the APIs and data sources differ greatly in design, protocols, data formats, and authentication methods, making integration and consolidation complex and error-prone, leading to increased costs and reduced reliability. Furthermore, evolving APIs and data sources require continuous maintenance and updates to existing integrations and data mappings, adding to the complexity and resource demands of managing API integrations and data consolidation. Ultimately, the effectiveness of Artificial Intelligence (AI) assistants is directly impacted by the efficiency and quality of API integrations and data consolidation. Inefficient integration processes can hinder the AI assistants' ability to access various services and provide personalized experiences, limiting their potential to assist users.

Conventionally, the process of integrating APIs involves several manual steps. First, developers spend time researching and understanding API documentation for each provider, including the specific authentication methods, data formats, and use cases. Next, the developers design the integration process, considering the different data formats, authentication methods, and functional requirements of each API. Once the integration design is in place, developers write custom code for each API integration, which is time-consuming and error-prone, especially when dealing with complex or poorly documented APIs. Thorough testing of the integration is essential to ensure the functionality meets expectations, including manual testing and debugging, which is a slow and iterative process.

Moreover, as APIs may change over time, developers must continuously monitor and update their integrations, making maintenance and update a significant ongoing effort. The scalability of the system is also limited as the number of API integrations increases, requiring a corresponding increase in developer resources and time. These challenges result in increased costs, reduced agility, and a suboptimal user experience for both businesses and AI assistants.

Accordingly, although great advances have been made in the area of API integrations, there remains a need for a system and method to automate API integrations.

SUMMARY

This summary is provided to introduce a selection of concepts, in a simple manner, which is further described in the detailed description of the present disclosure. This summary is neither intended to identify key or essential inventive concepts of the subject matter nor to determine the scope of the disclosure.

In accordance with an embodiment of the present disclosure, a system to automate an integration of one or more Application Programming Interfaces (APIs) is disclosed. The system comprises one or more hardware processors and a memory coupled to the one or more hardware processors. The memory includes a plurality of modules in the form of programmable instructions executable by the one or more hardware processors. The plurality of modules include a data receiver module configured to receive an API documentation associated with the one or more APIs. The API documentation comprises a set of instructions for using the one or more APIs. The plurality of modules also include a data extraction module configured to extract one or more parameters from the received API documentation. The one or more parameters are extracted by interpreting the received API documentation by using one or more Natural Language Understanding (NLU) models and one or more Machine Learning (ML) models. The plurality of modules further include a code generation module configured to generate one or more integration scripts and one or more templates based on the extracted one or more parameters and a result of the interpretation by using an Artificial Intelligence (AI)-based code generation model. The plurality of modules further include a data identification module configured to identify one or more data mappings between one or more data formats associated with the one or more APIs upon generating the one or more integration scripts and the one or more templates. The one or more data mappings comprise one or more converting field names, one or more data types, and value representations to ensure compatibility. The plurality of modules further include a data implementation module configured to implement a data transformation logic for seamless data flow and compatibility between the one or more APIs upon identifying one or more data mappings. Furthermore, the plurality of modules further include a data testing module configured to generate a set of test cases and a set of scenarios based on the API documentation and one or more expected usage patterns upon implementing the data transformation logic. Further, the data testing module executes the generated set of test cases and the set of scenarios for identifying one or more issues in the one or more APIs.

In accordance with another embodiment of the present disclosure, a method to automate an integration of one or more application program interfaces (APIs) is disclosed. The method includes receiving, by one or more hardware processors, an API documentation associated with the one or more APIs. The API documentation comprises a set of instructions for using the one or more APIs. Further, the method includes extracting, by the one or more hardware processors, one or more parameters from the received API documentation. The one or more parameters are extracted by interpreting the received API documentation by using one or more Natural Language Understanding (NLU) models and one or more Machine Learning (ML) models. Further, the method includes generating, by the one or more hardware processors, one or more integration scripts and one or more templates based on the extracted one or more parameters and a result of the interpretation by using an Artificial Intelligence (AI)-based code generation model. Further, the method includes identifying, by the one or more hardware processors, one or more data mappings between one or more data formats associated with the one or more APIs upon generating the one or more integration scripts and the one or more templates. The one or more data mappings comprise one or more converting field names, one or more data types, and value representations to ensure compatibility. Additionally, the method includes implementing, by the one or more hardware processors, a data transformation logic for seamless data flow and compatibility between the one or more APIs upon identifying one or more data mappings, generating, by the one or more hardware processors, a set of test cases and a set of scenarios based on the API documentation and one or more expected usage patterns upon implementing the data transformation logic. Further, the method includes executing, by one or more hardware processors, the generated set of test cases and the set of scenarios for identifying one or more issues in the one or more APIs.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
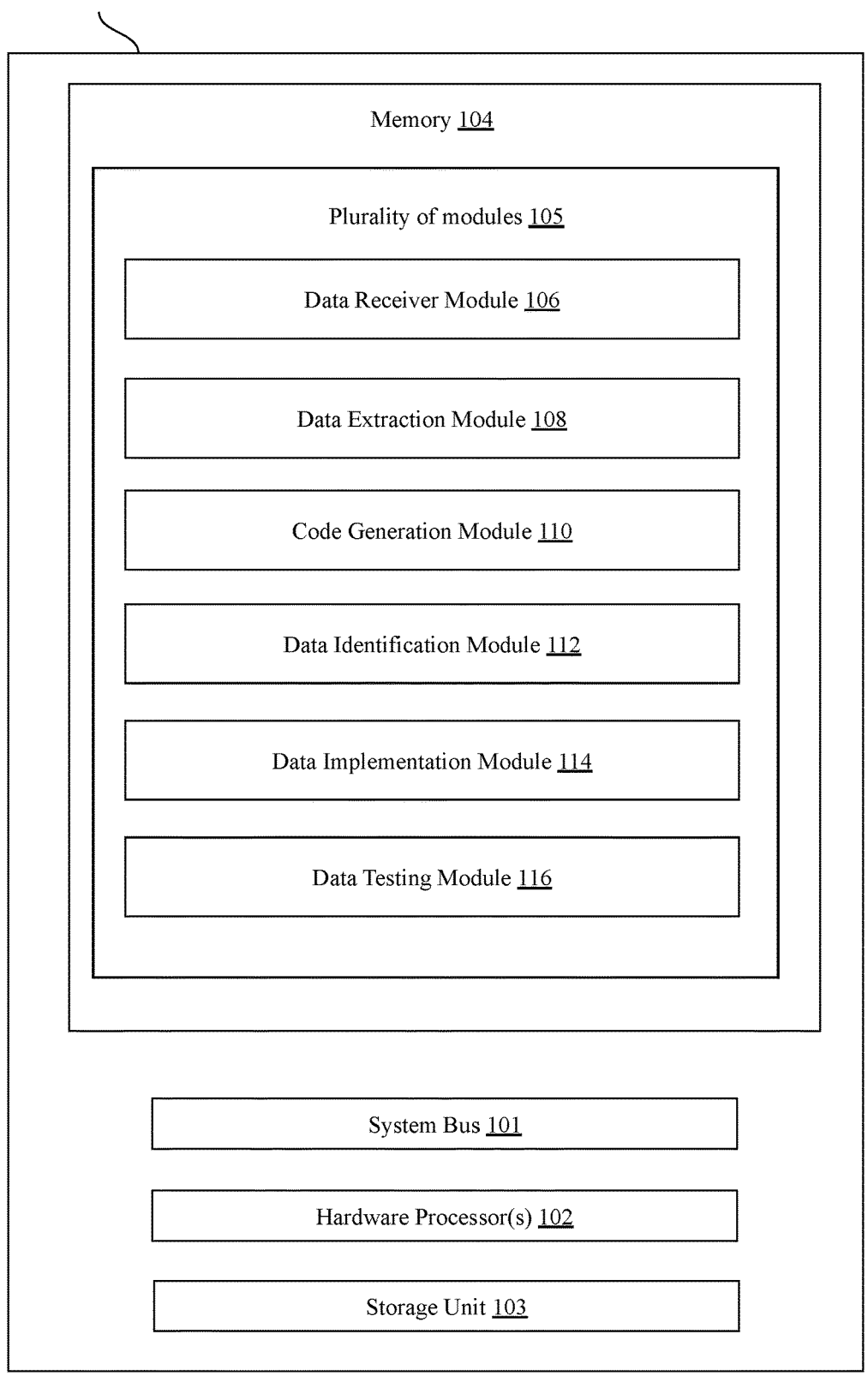
FIG. 1 is a block diagram illustrating an exemplary system to automate an integration of one or more application program interface (APIs), in accordance with a preferred embodiment of the present application.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

While the system of the present application is subject to various modifications and alternative forms, specific embodiments have been shown by way of example in the drawings and are described in detail. It should be understood that the description of specific embodiments is not intended to limit the invention to the particular embodiment disclosed, but rather to cover all modifications, equivalents, and alternatives falling within the scope of the present application as defined by the appended claims.

DETAILED DESCRIPTION

Illustrative embodiments of the system of the present application are provided herein. It should be appreciated that in the development of any actual embodiment, various implementation-specific decisions are required to achieve the developer's specific goals, such as compliance with system-related and business-related constraints, which vary from one implementation to another. Moreover, it should be appreciated that such a development effort might be complex and time-consuming but would nevertheless be a routine undertaking for those of ordinary skill in the art having the benefit of this disclosure.

The device should be understood, both as to its structure and operation, from the accompanying drawings, taken in conjunction with the accompanying description. Various embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present disclosure, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or subsystems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Accordingly, the term "application program interface (API)" should be understood as an application programming interface which is a set of protocols, tools, and standards for building software applications.

Figure 2:
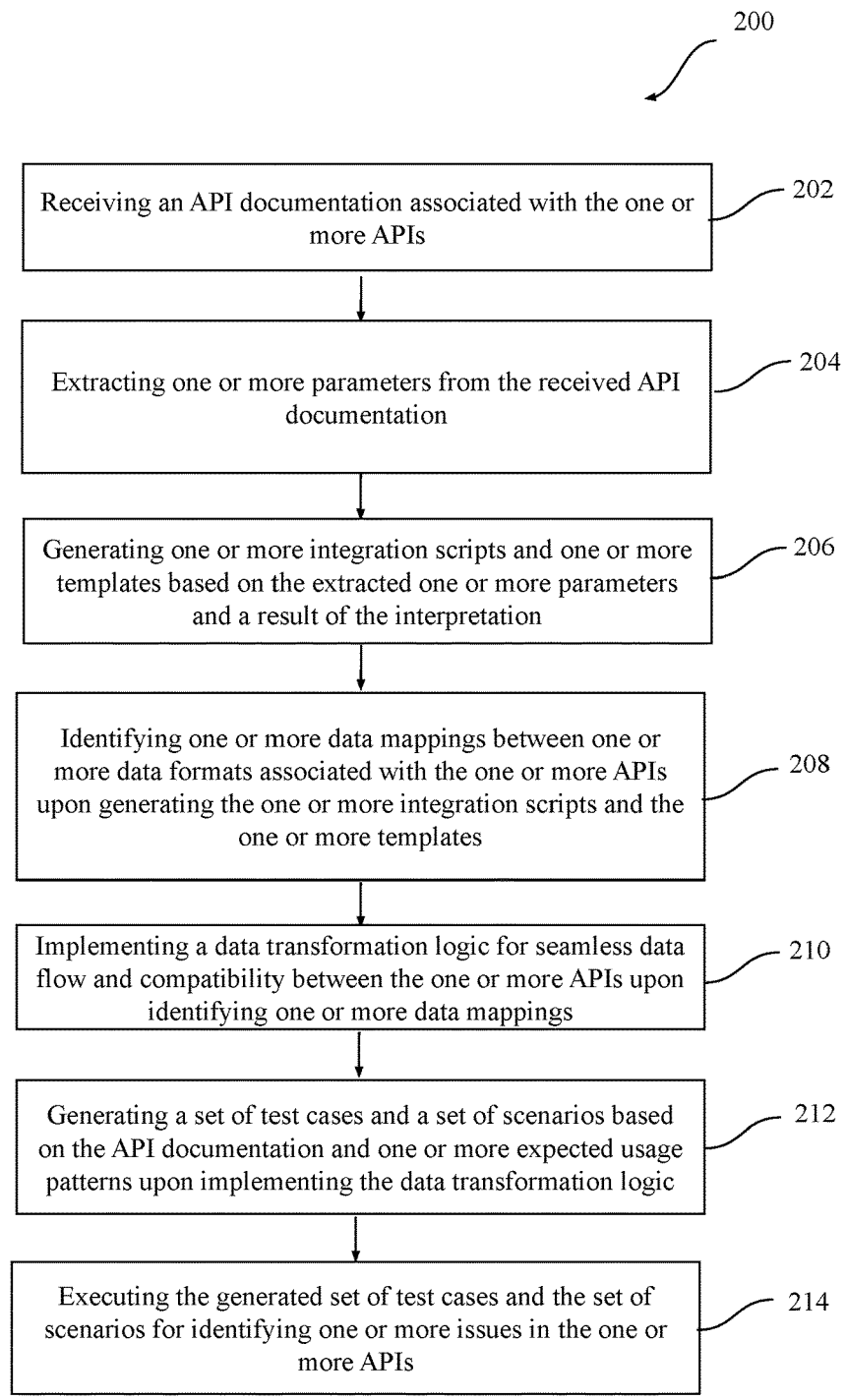
FIG. 2 is a process flow diagram illustrating an exemplary method to automate the integration of the one or more APIS, in accordance with an embodiment of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

FIG. 1 is a block diagram illustrating an exemplary system to automate an integration of one or more APIs, in accordance with an embodiment of the present disclosure. According to FIG. 1, the system 100 for automating an integration of one or more application program interface (APIs) includes a system bus 101, one or more hardware processors 102, a storage unit 103, a memory 104, and a plurality of modules 105. The one or more hardware processors 102, the storage unit 103, the memory 104 are communicatively coupled through the system bus 101 or any similar mechanism. In an embodiment of the present disclosure, the memory 104 is coupled to the one or more hardware processors 102. The memory 104 includes the plurality of modules 105 in the form of programmable instructions executable by the one or more hardware processors 102. In an embodiment of the present disclosure the plurality of modules 105 comprises a data receiver module 106, a data extraction module 108, a code generation module 110, a data identification module 112, a data implementation module 114, a data testing module 116, a validation module, a data learning module, a data maintaining module, an integration module, a model generating module, an AI-based data mapping model, a data adaptation module, and a feedback generation module. Details on the plurality of modules 105 have been elaborated in subsequent paragraphs of the present description.

The one or more hardware processors 102, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 102 may also include embedded controllers, such as generic or programmable logic devices or arrays, application specific integrated circuits, single-chip computers, and the like. The storage unit 103 may be a cloud storage or a local file directory within a remote server.

The memory 104 may be non-transitory volatile memory and non-volatile memory. The memory 104 may be coupled for communication with the one or more hardware processors 102, such as being a computer-readable storage medium. The one or more hardware processors 102 may execute machine-readable instructions and/or source code stored in the memory 104. A variety of machine-readable instructions may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 104 includes the plurality of modules 105 stored in the form of machine-readable instructions on any of the above-mentioned storage media and may be in communication with and executed by the one or more hardware processors 102.

Embodiments of the application further provide a non-transitory computer-readable storage medium, in which a computer program is stored. When executed by the processor, the computer program may prevent misdemeanor behavior during the events.

The non-transitory computer-readable storage medium may be any combination of one or more computer-readable media. The computer-readable medium may be a computer-readable signal medium or a computer-readable storage medium. The computer-readable storage medium may be, but is not limited to, for example, an electrical, magnetic, optical, electromagnetic, infrared or semiconductor system, device or apparatus or any combination thereof. More specific examples (non-exhaustive list) of the computer-readable storage medium include an electrical connector with one or more wires, a portable computer disk, a hard disk, a RAM, a ROM, an Erasable Programmable ROM (EPROM) or a flash memory, an optical fiber, a portable CD-ROM, an optical storage device, a magnetic storage device, or any proper combination thereof. In the application, the computer-readable storage medium may be any tangible medium including or storing a program that may be used by or in combination with an instruction execution system, device, or apparatus.

The data receiver module 106 is configured to receive an API documentation associated with the one or more APIs. In an embodiment of the present disclosure, the API documentation includes a set of instructions for using the one or more APIs.

Further the data extraction module 108 is configured to extract one or more parameters from the received API documentation. In an embodiment of the present disclosure, the one or more parameters are extracted by interpreting the received API documentation by using one or more Natural Language Understanding (NLU) models and one or more Machine Learning (ML) models. For example, the one or more parameters include one or more endpoints, one or more protocols, one or more authentication methods, one or more request/response parameters, the one or more data formats, and the like. For example, relevant information is extracted from database schemas and documentation, including table structures, field types, relationships, and constraints. In an embodiment of the present disclosure, the system 100 understands the relationships between various API elements, such as how different endpoints are interconnected and how data flows through the system. In an exemplary embodiment of the present disclosure, the one or more NLU models may include, without limitation, Hugging Face Transformers, SpaCy, or Natural Language Toolkit for natural language processing tasks, and third-generation Generative Pre-trained Transformer (GPT-3), GPT-Neo, or Text-to-Text Transfer Transformer (T5) for extracting information from API documentation.

In an embodiment of the present disclosure, a unified federated data model is generated for accommodating the diverse data types and formats based on the analysis of data structures across the different APIs. Further, common elements are identified to design the data model to be flexible enough to incorporate new APIs or changes to existing ones.

The code generation module 110 is configured to generate one or more integration scripts, one or more code snippets, and one or more templates based on the extracted one or more parameters and a result of the interpretation by using an Artificial Intelligence (AI)-based code generation model. For example, one or more integration scripts, one or more code snippets, and one or more templates include functions or classes to make API calls, handle authentication, manage errors, and interact with the federated data model. In an embodiment of the present disclosure, the system may customize generated code to adhere to specific programming languages, frameworks, or coding standards. In an embodiment of the present disclosure, the system 100 generates the one or more integration scripts, the one or more code snippets, and the one or more templates based on different protocols, data formats, and authentication methods. This ensures seamless data flow and compatibility between APIs, minimizing the need for manual intervention. The system 100 also automates the data transformation and mapping process, ensuring consistency and accuracy in data exchange between systems. In an exemplary embodiment of the present disclosure, the code generation module 110 uses third-generation Generative Pre-trained Transformer (GPT-3), GPT-Neo, or Text-to-Text Transfer Transformer (T5) for generating integration code based on the API documentation.

The data identification module 112 is configured to identify one or more data mappings between one or more data formats associated with the one or more APIs upon generating the one or more integration scripts and the one or more templates. In an exemplary embodiment of the present disclosure, the one or more data mappings include one or more converting field names, one or more data types, value representations to ensure compatibility, and the like. For example, the one or more data formats include one or more converting field names, a set of data types, and one or more value representations. In an embodiment of the present disclosure, the data identification module 112 may use pandas, Dynamic task scheduling (Dask), or Apache Arrow for data manipulation, transformation, and mapping between different API data formats.

The data implementation module 114 is configured to implement a data transformation logic to automatically convert data between databases and the federated data model upon identifying one or more data mappings. This ensures seamless data flow, compatibility between the one or more APIs, and minimizing manual intervention.

Further, the data testing module 116 is configured to generate a set of test cases and a set of scenarios based on the API documentation, the database schemas, the federated data model and one or more expected usage patterns to validate functionality and reliability of the integrations upon implementing the data transformation logic. Further, the data testing module is configured to execute the generated set of test cases and the set of scenarios for identifying one or more issues in the one or more APIs. In an exemplary embodiment of the present disclosure, the one or more issues include one or more incorrect data mappings, one or more authentication failures, and an unexpected API behavior. In an embodiment of the present disclosure, the data testing module 116 may use pytest, unittest (Python), or Junit (Java) for creating and executing test cases to validate API integration functionality and federated data model integrity.

The validation module is configured to validate a set of API integrations associated with the one or more APIs upon generating the one or more integration scripts and the one or more templates. In an embodiment of the present disclosure, the system includes a robust testing framework that automatically validates API integrations, ensuring that they function correctly and adhere to the requirements set by the service providers.

Furthermore, the data learning module is configured to monitor one or more API changes associated with the API. In an exemplary embodiment of the present disclosure, the one or more changes correspond to new endpoints, modified data formats, or deprecated features. The data learning module may also update the one or more integration scripts and the one or more data mappings based on a result of mapping. The data learning module performs a learning operation via the AI-based code generation model on an updated API documentation, one or more user feedbacks, and one or more integration issues and improves the AI-based code generation model based on a result of performing the learning operation. In an embodiment of the present disclosure, the data learning module may use fine-tuning large language models (e.g., third-generation Generative Pre-trained Transformer (GPT-3), GPT-Neo, or Text-to-Text Transfer Transformer (T5)) based on new API documentation and user feedback to improve understanding and code generation capabilities.

In an embodiment of the present disclosure, the system monitors the APIs for changes and updates, and automatically adjusts the integration code and data mappings when necessary. This reduces the maintenance burden and ensures that the integrations remain up-to-date and functional.

The data maintaining module is configured to detect one or more changes and one or more updates in the one or more APIs by monitoring the one or more APIs. In an embodiment of the present disclosure, the one or more changes correspond to one or more new endpoints, one or more modified data formats, and one or more deprecated features. Further, the data maintaining module automatically updates the one or more integration scripts and the one or more data mappings based on the detected one or more changes and the detected one or more updates.

The integration module is configured to facilitate a seamless connectivity between one or more AI assistants and one or more services and enable the one or more AI assistants to a wide range of systems for performing one or more tasks. In an exemplary embodiment of the present disclosure, the one or more tasks may include booking travel, ordering coffee, managing prescriptions, and the like.

Further, the model generating module is configured to create and update a unified federated data model consolidating and standardizing data from the one or more APIs. In an embodiment of the present disclosure, the consolidation and standardization of the data from the one or more APIs allows for automated data mapping and transformation between the one or more APIs and the unified federated data model. For example, disparate data from various integrated APIs is automatically consolidated creating a unified and holistic view of the customer for enhanced decision-making and personalized experiences. In an embodiment of the present disclosure, the AI-based data mapping model is used to map one or more data elements between the one or more APIs and the unified federated data model. This ensures consistent data exchange and seamless data flow across the entire ecosystem.

Furthermore, the data adaption module is configured to adapt to changes in the one or more APIs and the unified federated data model over time. In an embodiment of the present disclosure, the changes correspond to addition of new APIs, changes in data structures, and updates to the unified federated data model.

Furthermore, the feedback generation module is configured to generate one or more feedbacks to resolve the identified one or more issues.

In a use-case scenario, the system 100 is configured to streamline and automate the integration of 25 hotel supplier APIs into a core federated platform, enhancing efficiency, reducing manual labor, and improving scalability. This core federated platform is a travel content provider with a vast network of suppliers, offering customers a wide range of travel options. The current process of integrating multiple hotel supplier APIs is manual, time-consuming, and resource-intensive. The core federated platform aims to automate this process, enabling faster integration and better scalability while minimizing human intervention. Thus, the core federated platform implements the system 100, that allows the core federated platform to intelligently interpret API documentation, generate integration scripts, map data between APIs, and automate testing to ensure accurate integrations. The platform will be trained on a diverse set of 25 hotel supplier APIs, covering a wide range of hotel options, API structures, and documentation styles.

In implementation, a diverse set of 25 hotel supplier APIs is identified and collected which is used as the training dataset for the AI model. Further, the AI model is trained on the training dataset, focusing on natural language understanding, code generation, data transformation, and automated testing. Further, the system is developed and integrated into the core federated platform. Further, the system's 100 performance is continuously monitored, evaluated, and refined. Accordingly, the system 100 minimizes the need for manual labor and allows resources to be allocated to other critical tasks. Further, the AI-driven system 100 streamlines the integration process, leading to faster, more accurate, and consistent results. The system is configured to handle a larger number of hotel suppliers without being constrained by the limitations of manual API integration, enabling rapid growth and expansion.

In another use case scenario, the API documentation, the sample data, and integration examples are gathered from a wide range of travel service providers. Further, the gathered data is pre-processed and cleaned to ensure that it is suitable for training the AI models. The AI architecture is designed which may include NLP models for understanding API documentation, machine learning algorithms for code generation and data mapping, and automated testing frameworks. Furthermore, the models are trained on the collected data which result in iteratively refining and improving the AI's performance through techniques, such as transfer learning and fine-tuning.

Further, the AI system's performance is validated by integrating it with a subset of the target APIs, covering various travel services, such as flights, hotels, cars, events, dining, transfers, and things to do. Furthermore, one or more issues or limitations are identified and necessary improvements are made to the AI models and algorithms. The AI-driven API integration platform is deployed and its performance is monitored in real-world scenarios. Furthermore, the AI system is continuously updated and improved by incorporating new API data, refining the models, and addressing any issues that arise.

FIG. 2 is a process flow diagram illustrating an exemplary method to automate an integration of one or more application program interfaces (APIs), in accordance with an embodiment of the present disclosure.

At step 202, the method 200 includes receiving an API documentation associated with the one or more APIs. In an embodiment of the present disclosure, the API documentation includes a set of instructions for using the one or more APIs.

Further, at step 204, the method 200 includes extracting one or more parameters from the received API documentation. In an embodiment of the present disclosure, the one or more parameters are extracted by interpreting the received API documentation by using one or more Natural Language Understanding (NLU) models and one or more Machine Learning (ML) models. For example, the one or more parameters include one or more endpoints, one or more protocols, one or more authentication methods, one or more request/response parameters, the one or more data formats, and the like. In an exemplary embodiment of the present disclosure, the one or more NLU models may include, without limitation, Hugging Face Transformers, SpaCy, or Natural Language Toolkit for natural language processing tasks, and third-generation Generative Pre-trained Transformer (GPT-3), GPT-Neo, or Text-to-Text Transfer Transformer (T5) for extracting information from API documentation.

At step 206, the method 200 includes generating one or more integration scripts and one or more templates based on the extracted one or more parameters and a result of the interpretation by using an Artificial Intelligence (AI)-based code generation model. In an exemplary embodiment of the present disclosure, the third-generation Generative Pre-trained Transformer (GPT-3), GPT-Neo, or Text-to-Text Transfer Transformer (T5) is used for generating integration code based on the API documentation.

Furthermore, at step 208, the method 200 includes identifying one or more data mappings between one or more data formats associated with the one or more APIs upon generating the one or more integration scripts and the one or more templates. In an exemplary embodiment of the present disclosure, the one or more data mappings include one or more converting field names, one or more data types, value representations to ensure compatibility, and the like. For example, the one or more data formats include one or more converting field names, a set of data types, and one or more value representations. In an embodiment of the present disclosure, pandas, Dynamic task scheduling (Dask), or Apache Arrow is used for data manipulation, transformation, and mapping between different API data formats.

At step 210, the method 200 includes implementing a data transformation logic for seamless data flow and compatibility between the one or more APIs upon identifying one or more data mappings.

Further, at step 212, the method 200 includes generating a set of test cases and a set of scenarios based on the API documentation and one or more expected usage patterns upon implementing the data transformation logic.

At step 214, the method 200 includes executing the generated set of test cases and the set of scenarios for identifying one or more issues in the one or more APIs. In an exemplary embodiment of the present disclosure, the one or more issues include one or more incorrect data mappings, one or more authentication failures, and an unexpected API behavior. In an embodiment of the present disclosure, pytest, unittest (Python), or JUnit (Java) is used for creating and executing test cases to validate API integration functionality and federated data model integrity.

The method 200 includes validating a set of API integrations associated with the one or more APIs upon generating the one or more integration scripts and the one or more templates.

Furthermore, the method 200 includes monitoring one or more API changes associated with the API. The data learning module performs a learning operation via the AI-based code generation model on an updated API documentation, one or more user feedbacks, and one or more integration issues and improves the AI-based code generation model based on a result of performing the learning operation. In an embodiment of the present disclosure, fine-tuning large language models (e.g., third-generation Generative Pre-trained Transformer (GPT-3), GPT-Neo, or Text-to-Text Transfer Transformer (T5)) are used based on new API documentation and user feedback to improve understanding and code generation capabilities.

The method 200 includes detecting one or more changes and one or more updates in the one or more APIs by monitoring the one or more APIs. In an embodiment of the present disclosure, the one or more changes correspond to one or more new endpoints, one or more modified data formats, and one or more deprecated features. Further, the method 200 includes automatically updating the one or more integration scripts and the one or more data mappings based on the detected one or more changes and the detected one or more updates.

Further, the method 200 includes facilitating a seamless connectivity between one or more AI assistants and one or more services and enabling the one or more AI assistants to a wide range of systems for performing one or more tasks. In an exemplary embodiment of the present disclosure, the one or more tasks may include booking travel, ordering coffee, managing prescriptions, and the like.

Furthermore, the method 200 includes creating and updating a unified federated data model consolidating and standardizing data from the one or more APIs. In an embodiment of the present disclosure, the consolidation and standardization of the data from the one or more APIs allows for automated data mapping and transformation between the one or more APIs and the unified federated data model. In an embodiment of the present disclosure, the AI-based data mapping model is used to map one or more data elements between the one or more APIs and the unified federated data model.

Furthermore, the method 200 includes adapting to changes in the one or more APIs and the unified federated data model over time. In an embodiment of the present disclosure, the changes correspond to addition of new APIs, changes in data structures, and updates to the unified federated data model.

Furthermore, the method 200 includes generating one or more feedbacks to resolve the identified one or more issues.

Thus, various embodiments of the present invention provide a solution that allows businesses to concentrate on developing features using API content, while simplifying the API integration process and resolving data consolidation challenges via a no-code to low-code approach. Further, the present invention is directed to minimize the manual labor involved in integrating APIs from multiple travel content providers using AI-driven automation. For example, the travel content providers may include airlines, hotels, car rentals, events, dining, transfers, and things to do. The present invention is designed, such that it is scalable to accommodate future growth and expansion. Thus, the present invention enables the businesses to save time and resources which can now be allocated to other critical tasks.

Additionally, the present invention increases the efficiency of the API integration process by automating various tasks, such as natural language understanding for interpreting API documentation, code generation for creating integration scripts, data transformation for mapping data between APIs, and automated testing for ensuring the accuracy of the integrations. As a result, the present invention leads to faster, more accurate, and consistent results. Furthermore, the present invention improves scalability by enabling businesses to handle many suppliers with minimal manual labor through the streamlined integration process. Thus, the present invention allows companies to scale their operations and grow more rapidly without being constrained by the limitations of manual API integration.

Further, the present invention uses advanced natural language processing, machine learning, and deep learning techniques to understand API documentation, generate integration code, and transform data between APIs and databases. In an embodiment of the present disclosure, creation and updating a unified federated data mode provides businesses with a centralized view of their data from disparate systems. This capability allows for the evaluation and mapping of data elements across diverse databases. Furthermore, the present invention reduces the time, effort, and cost associated with manual API integration and data mapping processes. Automating these tasks allows companies to enhance efficiency, improve scalability, and gain a competitive edge in the market. The efficiency of the API integration process is enhanced by automating tasks like natural language understanding for interpreting API documentation, code generation for creating integration scripts, data transformation for mapping data between APIs, and automated testing for ensuring the accuracy of the integrations. This will lead to faster, more accurate, and consistent results. The present invention improves the scalability by enabling businesses to handle a large number of suppliers with minimal manual labor by streamlining the integration process. This will allow companies to scale their operations and grow more rapidly without being constrained by the limitations of manual API integration. Further, the present invention's adaptability and continuous learning from new API documentation and user feedback ensure the system to remain up-to-date and relevant in an ever-evolving landscape.

Furthermore, the present invention plays a crucial role in enabling AI assistants and personalized services by streamlining data consolidation and providing a unified view of the customer. This comprehensive understanding of customer data is vital for delivering highly tailored experiences, driving customer satisfaction, and fostering brand loyalty. Thus, the present invention represents a groundbreaking innovation in AI-driven API integration and data mapping, offering a versatile and powerful solution for businesses seeking to compete in the digital age. With the present invention's potential to transform customer experiences and support AI-assisted services, the present invention acts as an indispensable tool for organizations striving to thrive in an increasingly interconnected world. By implementing the AI-driven API integration platform, organizations can streamline their API integration processes, enabling them to scale more efficiently and focus on core business activities. Additionally, AI assistants can benefit from improved access to various services, enhancing their capabilities and providing a better user experience.

Further, the present invention manages a wide range of data types, such as pricing information, availability, booking details, customer profiles, and reviews. It is also capable of processing both structured and unstructured data, as well as handling different data formats like JSON, XML, and CSV. Further, the present invention uses multiple programming languages, tools, and frameworks to develop the AI-driven platform. For example, Python for machine learning and natural language processing tasks, JavaScript for developing the user interface, and backend technologies like Node.js or Django for server-side functionality. AI tools and libraries such as GPT-based models, TensorFlow, PyTorch, and scikit-learn may be employed for tasks, such as natural language processing, code generation, data transformation, and automated testing. The system allows for easier scaling, meeting the needs of growing businesses or those with complex integration requirements.

Further, by automating many of the time-consuming tasks associated with API integration, the system can significantly speed up the process, enabling faster integration of multiple APIs across various industries and providers. The AI-driven automation associated with the system helps minimize human errors that can occur during manual integration processes. Further, the system can generate more accurate and reliable integrations, ensuring seamless data flow and interoperability between services. The AI-driven approach of the system enables it to be adaptable to various industries and use cases, making it a versatile solution for businesses with diverse API integration needs. Thus, the system 100 offers a more efficient, accurate, and scalable solution for API integration, providing a valuable alternative to traditional manual methods and existing tools.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 101 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A system to automate an integration of one or more application program interface (APIs), the system comprising:
   one or more hardware processors; and
   a memory coupled to the one or more hardware processors, wherein the memory comprises a plurality of modules in the form of programmable instructions executable by the one or more hardware processors, and wherein the plurality of modules comprises:
   a data receiver module configured to receive an API documentation associated with the one or more APIs, wherein the API documentation comprises a set of instructions for using the one or more APIs;
   a data extraction module configured to extract one or more parameters from the received API documentation, wherein the one or more parameters are extracted by interpreting the received API documentation by using one or more Natural Language Understanding (NLU) models and one or more Machine Learning (ML) models;
   a code generation module configured to generate one or more integration scripts and one or more templates based on the extracted one or more parameters and a result of the interpretation by using an Artificial Intelligence (AI)-based code generation model;
   a data identification module configured to identify one or more data mappings between one or more data formats associated with the one or more APIs upon generating the one or more integration scripts and the one or more templates, wherein the one or more data mappings comprise one or more converting field names, one or more data types, and value representations to ensure compatibility;
   a data implementation module configured to implement a data transformation logic for seamless data flow and compatibility between the one or more APIs upon identifying one or more data mappings; and
   a data testing module configured to:
      generate a set of test cases and a set of scenarios based on the API documentation and one or more expected usage patterns upon implementing the data transformation logic; and
      execute the generated set of test cases and the set of scenarios for identifying one or more issues in the one or more APIs.

2. The system of claim 1, wherein the one or more parameters comprise one or more endpoints, one or more protocols, one or more authentication methods, one or more request/response parameters, and the one or more data formats.

3. The system of claim 1, wherein the one or more data formats comprise one or more converting field names, a set of data types, and one or more value representations.

4. The system of claim 1, wherein the one or more issues comprise one or more incorrect data mappings, one or more authentication failures, and an unexpected API behavior.

5. The system of claim 1, further comprises a validation module configured to validate a set of API integrations associated with the one or more APIs upon generating the one or more integration scripts and the one or more templates.

6. The system of claim 1, further comprising a data learning module configured to:
   monitor one or more API changes associated with the API;
   perform a learning operation via the AI-based code generation model on an updated API documentation, one or more user feedbacks, and one or more integration issues; and
   improve the AI-based code generation model based on a result of performing the learning operation.

7. The system of claim 1, further comprising a data maintaining module configured to:
   detect one or more changes and one or more updates in the one or more APIs by monitoring the one or more APIs, wherein the one or more changes correspond to one or more new endpoints, one or more modified data formats, and one or more deprecated features; and
   automatically update the one or more integration scripts and the one or more data mappings based on the detected one or more changes and the detected one or more updates.

8. The system of claim 1, further comprising an integration module configured to:
   facilitate a seamless connectivity between one or more AI assistants and one or more services; and
   enable the one or more AI assistants to a wide range of systems for performing one or more tasks, wherein the one or more tasks comprises booking travel, ordering coffee, and managing prescriptions.

9. The system of claim 1, further comprising a feedback generation module configured to generate one or more feedbacks to resolve the identified one or more issues.

10. The system of claim 1, further comprising a model generating module configured to create and update a unified federated data model consolidating and standardizing data from the one or more APIs, wherein the consolidation and standardization of the data from the one or more APIs allows for automated data mapping and transformation between the one or more APIs and the unified federated data model.

11. The system of claim 10, wherein an AI-based data mapping model is used to map one or more data elements between the one or more APIs and the unified federated data model.

12. The system of claim 10, further comprising a data adaption module configured to adapt to changes in the one or more APIs and the unified federated data model over time, wherein the changes correspond to addition of new APIs, changes in data structures, and updates to the unified federated data model.

13. A method to automate an integration of one or more application program interface (APIs), the method comprising:
   receiving, by one or more hardware processors, an API documentation associated with the one or more APIs, wherein the API documentation comprises a set of instructions for using the one or more APIs;
   extracting, by the one or more hardware processors, one or more parameters from the received API documentation, wherein the one or more parameters are extracted by interpreting the received API documentation by using one or more Natural Language Understanding (NLU) models and one or more Machine Learning (ML) models;
   generating, by the one or more hardware processors, one or more integration scripts and one or more templates based on the extracted one or more parameters and a result of the interpretation by using an Artificial Intelligence (AI)-based code generation model;
   identifying, by the one or more hardware processors, one or more data mappings between one or more data formats associated with the one or more APIs upon generating the one or more integration scripts and the one or more templates, wherein the one or more data mappings comprise one or more converting field names, one or more data types, and value representations to ensure compatibility;
   implementing, by the one or more hardware processors, a data transformation logic for seamless data flow and compatibility between the one or more APIs upon identifying one or more data mappings;
   generating, by the one or more hardware processors, a set of test cases and a set of scenarios based on the API documentation and one or more expected usage patterns upon implementing the data transformation logic; and
   executing, by the one or more hardware processors, the generated set of test cases and the set of scenarios for identifying one or more issues in the one or more APIs.

14. The method of claim 13, further comprising validating a set of API integrations associated with the one or more APIs upon generating the one or more integration scripts and the one or more templates.

15. The method of claim 13, further comprising monitoring one or more API changes associated with the API and performing a learning operation via the AI-based code generation model on an updated API documentation, one or more user feedbacks, and one or more integration issues and further improving the AI-based code generation model based on a result of performing the learning operation.

16. The method of claim 13, further comprising detecting one or more changes and one or more updates in the one or more APIs by monitoring the one or more APIs, wherein the one or more changes correspond to one or more new endpoints, one or more modified data formats, and one or more deprecated features and updating, by one or more hardware processors, automatically the one or more integration scripts and the one or more data mappings based on the detected one or more changes and the detected one or more updates.

17. The method of claim 13, further comprising facilitating a seamless connectivity between one or more AI assistants and one or more services and enabling the one or more AI assistants to a wide range of systems for performing one or more tasks, wherein the one or more tasks comprises booking travel, ordering coffee, and managing prescriptions.

18. The method of claim 13, further comprising generating one or more feedbacks to resolve the identified one or more issues.

19. The method of claim 13, further comprising creating and updating a unified federated data model consolidating and standardizing data from the one or more APIs, wherein the consolidation and standardization of the data from the one or more APIs allows for automated data mapping and transformation between the one or more APIs and the unified federated data model.

20. The method of claim 18, further comprising adapting to change in the one or more APIs and the unified federated data model over time, wherein the changes correspond to addition of new APIs, changes in data structures, and updates to the unified federated data model.

* * * * *